(No Model.)
W. HETRICK.
HARROW.
No. 454,352. Patented June 16, 1891.
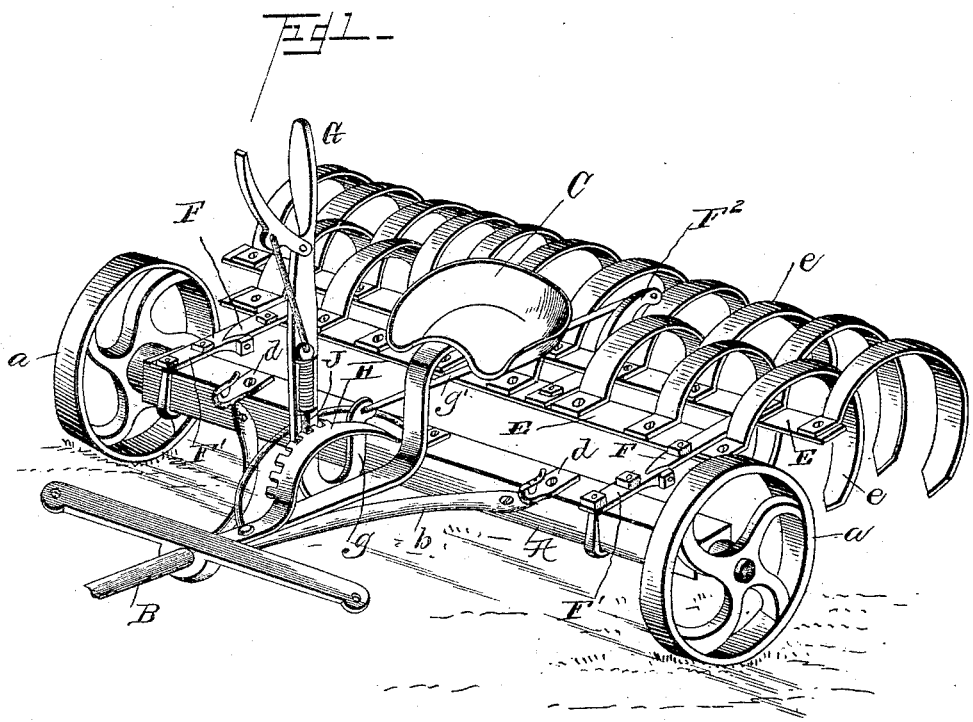
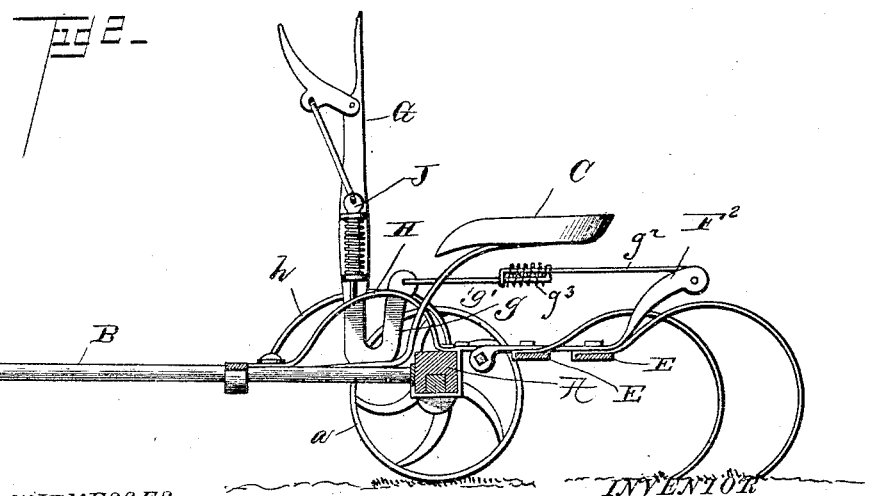
WITNESSES
F. L. Durand
Van Buren Hillyard
INVENTOR
William Hetrick
By R. S. & A. P. Lacey
his Attorneys

UNITED STATES PATENT OFFICE.

WILLIAM HETRICK, OF MEXICO, PENNSYLVANIA.

HARROW.

SPECIFICATION forming part of Letters Patent No. 454,352, dated June 16, 1891.

Application filed January 29, 1891. Serial No. 379,542. (No model.)

*To all whom it may concern:*

Be it known that I, WILLIAM HETRICK, a citizen of the United States, residing at Mexico, in the county of Juniata and State of Pennsylvania, have invented certain new and useful Improvements in Harrows; and I do hereby declare the following to be a full, clear, and exact description of the invention, such as will enable others skilled in the art to which it appertains to make and use the same.

This invention relates to harrows, and particularly to that class which are mounted on wheels.

The object of the invention is the provision of a harrow that will perform its work in an efficient and satisfactory manner, and which can be easily manipulated to harrow the ground at a greater or less depth, the harrow being under the control of the driver and adapted to follow the inequalities of the ground.

The improvement consists of the novel features which will be hereinafter more fully described and claimed, and which are shown in the annexed drawings, in which—

Figure 1 is a perspective view of a harrow embodying my invention. Fig. 2 is a cross-section of the harrow in front of the operating-lever and the connection between the said lever and the harrow.

The connecting-rod (not a link) between the middle bar $F^2$ and the lever G has a sliding joint, and is provided with a spiral spring to prevent the teeth from getting fastened on a stump or other solid obstruction.

The draft-frame comprises the axle A, which is provided at its ends with the wheels $a\ a$, and the tongue B, which is secured to the axle A, and which is braced by the hounds $b\ b$. The seat C is secured to the tongue B and extends slightly in the rear of the axle, so that the weight of the driver will relieve the team wholly or in part of the weight of the tongue and assist in holding the harrow down to its work. The hooks $d\ d$ near the ends of the axle are provided for attachment thereto of extra draft.

The harrow composed of the parallel bars E E, having spring-teeth $e$, is connected with the axle by the short bars F and F', which are pivotally connected at their opposing ends, the bar F having the harrow, tooth-bars E E, bolted or otherwise fastened thereto, and the bars F' being rigidly secured to the axle A. The middle bar $F^2$ has its rear end projected up and curved rearwardly. The operating-lever G has its lower end recurved, and is pivotally connected at the curve or bent end to the tongue. The recurved portion of short arm $g$ of the lever is connected by connecting-rods $g'$ and $g^2$ with the vertical arm of the bar $F^2$. The lever and the arm $g$ thereof work between the notched segment H and the guard-bar I, which is parallel with the said notched segment, both being secured at their ends to the axle and the tongue, respectively, as shown. The latch-bolt J is mounted on the lever G, and operates in the usual manner, in connection with the notched segment, to hold the harrow at the required position.

The harrow is of usual construction, being composed of parallel bars E E and spring-teeth $e$, the latter being equally spaced on the bars E, and so disposed that the teeth on one bar will come opposite the teeth on the other bar to thoroughly harrow the soil.

In use the depth of the harrowing can be regulated by manipulating the lever G in the proper direction, as will be readily comprehended. By removing some of the middle teeth on both bars the harrow can be used for harrowing corn. The links $g'$ and $g^2$ have their inner ends overlapped and bent up at right angles and connected so that they are free to slide on one another. A spring $g^3$ is interposed between the bent ends of the links and surrounds the overlapping portions. In case the teeth strike a root or other unyielding substance, the link $g^2$ will slide on the link $g'$ and permit the harrow to tilt, thereby preventing damage to the machine.

Having thus described my invention, what I claim, and desire to secure by Letters Patent, is—

The hereinbefore-specified wheel-harrow, composed of the axle A, having wheels $a\ a$ at its ends, the tongue secured to the axle and having the seat fastened thereon and extending over the axle, the harrow composed of parallel bars and spring-teeth secured on the bars, the teeth on one bar coming opposite the space between the teeth on the other bar, the bars F and F', pivoted together at their opposing ends, one bar being secured to the axle and the other bar secured to the harrow-bars, the middle bar F², having its end projected up, the notched segment and the guard-bar secured at their ends to the tongue and the axle, respectively, and the operating-lever G, having its end $g$ recurved and connected by a link with the vertical end of the bar F² and provided with a latch-bolt, substantially as set forth.

In testimony whereof I affix my signature in presence of two witnesses.

WILLIAM HETRICK.

Witnesses:
I. NORTH,
MAGGIE MARKS.